United States Patent
Scharf et al.

[15] 3,657,793
[45] Apr. 25, 1972

[54] METHOD AND DEVICE FOR REDUCING THE SPACING BETWEEN THE JACKET TUBE OF NUCLEAR REACTOR FUEL RODS AND THE CHARGE OF FUEL RECEIVED THEREIN

[72] Inventors: Hans Scharf, Nurnberg; Gerhard Boplat, Nurnberg; Eckhard Steinberg, Erlangen, all of Germany

[73] Assignee: Siemens Aktiengesellschaft, Berlin, Germany

[22] Filed: Nov. 21, 1968

[21] Appl. No.: 777,681

[30] Foreign Application Priority Data

Nov. 22, 1967 Germany..................P 16 14 756.9

[52] U.S. Cl................................29/421, 29/514, 29/515, 29/517, 72/63, 72/284, 72/370
[51] Int. Cl.................................................B23p 17/00
[58] Field of Search...............29/421, 514, 515, 517; 72/63, 72/284, 56, 370, 367, 372, 284

[56] References Cited

UNITED STATES PATENTS

| | | | |
|---|---|---|---|
| 2,423,862 | 7/1947 | Vorobik | 72/63 X |
| 2,894,421 | 7/1959 | Appel | 72/428 X |
| 2,986,051 | 5/1961 | Appel | 72/402 |
| 3,035,340 | 5/1962 | Appel | 29/544 |
| 3,100,742 | 8/1963 | McGeary et al. | 29/517 X |
| 3,192,621 | 7/1965 | Bauer et al. | 29/421 X |
| 3,372,460 | 3/1968 | Burns et al. | 29/517 X |

Primary Examiner—Charlie T. Moon
Assistant Examiner—Victor A. D. Palma
Attorney—Curt M. Avery, Arthur E. Wilfond, Herbert L. Lerner and Daniel J. Tick

[57] ABSTRACT

Method of reducing the spacing between the jacket tube of nuclear reactor fuel rods and the charge of fuel received therein includes pressing and permanently deforming by means of a ring-shaped hydraulic pressure cushion a respective ring-shaped zone of the jacket tube onto a body disposed in the tube and having substantially the cross-sectional dimension of the charge of fuel to be received in the tube, and simultaneously advancing the jacket tube and the body stepwise through the pressure cushion, the length of each advancing step being adjusted to the width of the ring-shaped zone.

11 Claims, 4 Drawing Figures

PATENTED APR 25 1972　　　　　　　　　　　　　　　　　　　3,657,793

METHOD AND DEVICE FOR REDUCING THE SPACING BETWEEN THE JACKET TUBE OF NUCLEAR REACTOR FUEL RODS AND THE CHARGE OF FUEL RECEIVED THEREIN

Our invention relates to method and device for reducing the spacing between the jacket tube of nuclear reactor fuel rods and the charge of fuel received therein.

Nuclear reactor fuel rods are generally formed of a jacket tube, for example of stainless steel, containing a charge of nuclear fuel, for example in the form of cylindrical tablets. Due to the heating of such nuclear fuel rods during the operation of the reactor, thermal expansion of the involved materials occurs, the thermal coefficient of expansion of the jacket tube material in some cases is greater than that of the nuclear fuel.

If a specific maximum play or spacing of the fuel tablets in the jacket tube is exceeded in such reactors, longitudinal folds produced by pressure of the coolant occur at the fuel rod under reactor operating conditions, leading to a break in the jacket tube as a result of expansion fatigue for cyclic stresses due to changes in temperature. The least possible play between the jacket tube and the fuel tablet contents thereof is therefore required when the fuel rods are in the cool state which necessarily calls for very narrow tolerances both for the jacket as well as the fuel. The allowable play is dependent upon the material, the state or condition of the material and the dimensions of the jacket tube; in a disadvantageous case, the play can approach zero.

Quite independently of the fact that the maintenance of such production tolerances is extraordinarily difficult (the jacket tubes and fuel tablets must be divided into classes of tolerances) and is therefore accompanied by correspondingly large expenses, great technical difficulties are encountered in the production of the fuel rod, especially during the process of filling it with the fuel. This becomes immediately clear when it is realized that the play or gap between jacket tube and fuel tablets, as the latter are being inserted in the jacket tube, need be at most $30\mu$, for example, while the thickness of a human hair, in contrast thereto, is about 50 to $80\mu$.

To solve this problem, different ways have heretofore been proposed and investigated, all of which are based on providing a greater clearance between fuel rod jacket tube and fuel tablet. Thus, for example, attempts have been made to uniformly press the jacket tube of the completed fuel rod onto the fuel rod core inside a pressure vessel with a pressure medium such as water, for example. Therewith only relatively small clearances between the fuel charges and the jacket tube are to be eliminated since the limit for the formation of folds is rapidly attained. Also the pressing of the jacket tube onto the fuel core with the aid of shock waves does not lead to any satisfactory results. Although relatively large clearance gaps between the fuel tablets and jacket tube can be diminished by such a method, it is hardly capable of being used for thin-walled steel tubes due to the dislocations of the tablets that are produced. The use of a swaging process is ruled out because the fuel tablets (sintered bodies) become destroyed thereby. In fact, heretofore, no satisfactorily operating method for solving the aforementioned problem has become known.

It is accordingly an object of our invention to provide method and device for reducing the clearance gap between the jacket tube of nuclear reactor fuel rods and the charge of fuel received therein which can be used for thin-walled steel jacket tubes and which will not damage the fuel tablets contained therein.

With the foregoing and other objects in view, we provide in accordance with our invention, method for reducing the clearance gap between the jacket tube of nuclear reactor fuel rods and the charge of fuel received therein, which comprises pressing and permanently deforming a respective ring-shaped zone of the jacket tube onto the charge of fuel by means of a ring-shaped hydraulic pressure cushion as the jacket tube and fuel charge are fed stepwise through the pressure cushion, the length of the steps being adjusted to the width of the ring-shaped zone. The jacket tube is advanced stepwise through the ring-shaped hydraulic pressure cushion which is subjected to pressure at a frequency corresponding to the stepwise advance, and thereby progressively effects the required reduction in the diameter of the fuel rod jacket tube. Tests that have been carried out have shown that in this way an original diametric spacing or gap of up to about $500\mu$ can be eliminated without the formation of a fold in the jacket tube. The residual spacing or gap between fuel and jacket tube determined by the natural resilience of the material of the jacket tube is about $20\mu$ and is so small that even for simulated reactor conditions no fold formation will occur in the jacket tube.

To obtain a uniformly smooth surface, it is thereby expedient that the pressure zones overlap one another somewhat whereby a mutual alignment or adjustment of the fuel tablets occurs and dislocations are not produced. Contrariwise, it is obviously also possible, by employing a greater length of feed step and therewith a greater spacing of the pressure zones, to obtain a wave-shaped tube surface which offers the expectation of possibly more advantageous heat transfer characteristics for the coolant. The method of our invention is also utilizable for calibrating thin-walled tubes. In accordance with a further feature of the invention a floating core is used in the jacket tube compression device instead of the fuel column or row of tablets. In this way, a relatively simple and expense-saving, as well as rapid calibration of tubes such as fuel element jacket tubes, for example, is capable of being achieved.

In accordance with additional features of our invention, the device employed in carrying out the method includes a calibrating mandrel for calibrating a jacket tube to produce a fuel rod, the calibrating mandrel is replaced by a column of fuel tablets. Since an increase in the length of the jacket tube occurs with the method of our invention, it is advantageous for the production of fuel rods, to hold together the column of tablets by a slight spring pressure from one side, and thereby to avoid indentations of the jacket tube in the gaps that may form between the tablets. If it should be desired, however, to have a specific spacing between the fuel tablets, for example for the purpose of receiving decomposition gas therein, a spacing of the tablets with the formation of defined intermediate chambers is effected by these indentations of the jacket tube in the small spaces between the fissionable fuel tablets.

Other features which are considered as characteristic for the invention are set forth in the appended claims.

Although the invention is illustrated and described herein as embodied in method and device for reducing the spacing between the jacket tube of nuclear reactor fuel rods and the charge of fuel received therein, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 2 is a diagrammatic longitudinal sectional view of the fuel rod shown in FIG. 1a.

Figure 1A:
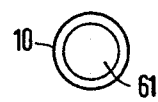
FIGS. 1a and 1b are diagrammatic cross sectional views respectively of an unstressed fuel rod and of a fuel rod formed with a longitudinal fold due to compression.
Figure 1B:
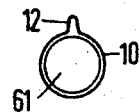

Referring now to the drawing and first particularly to FIG. 1a, there is shown in diagrammatic cross sectional view a fuel rod formed of an unstressed jacket tube 10 in which a fissionable nuclear fuel core 61 is received, the jacket tube 10 having the dimensional tolerances necessary for effecting the charging thereof with the fuel tablets 61 in accordance with the invention. In FIG. 1b which is a view similar to that of FIG. 1a, the fuel rod is seen after it has been subjected to a pressure loading during operation of a nuclear reactor in which it has been disposed or after an attempt has been made to press the jacket tube onto the fissionable fuel core by one of the aforementioned prior art methods. The consequent stressing of the jacket tube 10 has thus produced a longitudinal fold 12 therein which, due to the varying stresses imposed on the fuel rod during operation of a reactor, tend toward the manifestation of fatigue and thereby result in the production of breaks in the jacket tube.

Figure 2:
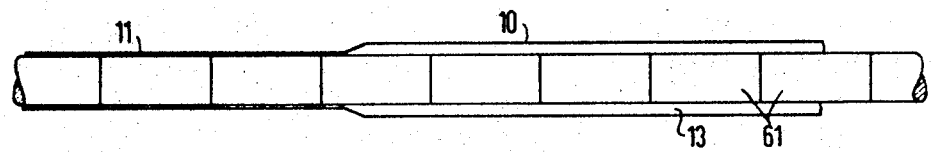

In the longitudinal sectional view of a partial length of a fuel rod shown in FIG. 2, a portion 11 of the jacket tube 10 has been pressed in accordance with the method of the invention, over the column of fissionable material 61. The portion 11 originally had the dimensions of the tube portion 10 so that the fuel tablets 61 were readily able to be received therein without difficulty due to adequate clearance 13 between the tablets 61, on the one hand, and the tube 10 on the other hand. In view of the permissible and desirable large spacing 13, the division of the respective fissionable fuel tablets as well as jacket tubes into tolerance classes can be dispensed with.

Figure 3:
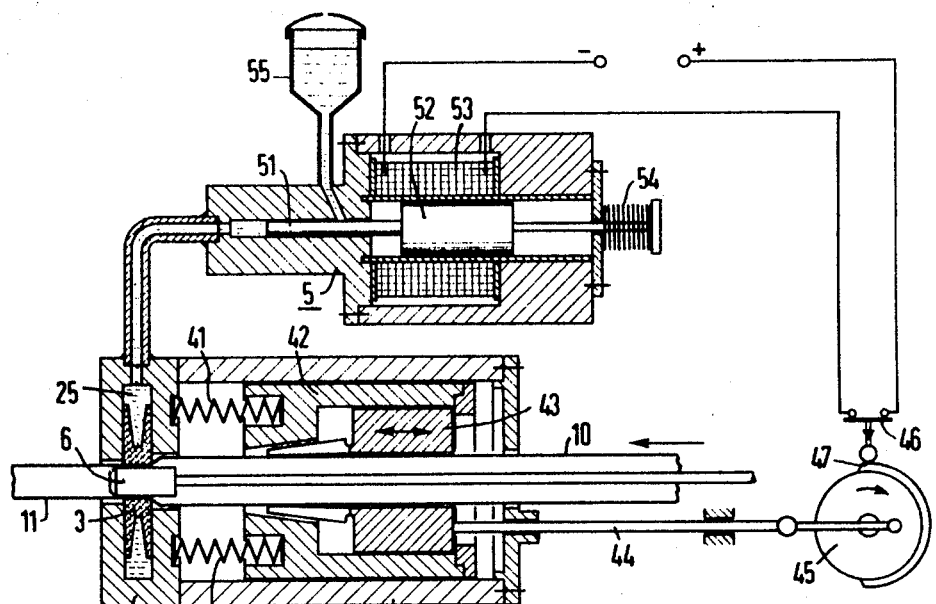
FIG. 3 is a device for carrying out the method of reducing the gap between the jacket tube of a fuel rod and a charge of fuel received therein, in accordance with the invention.

In FIG. 3 there is shown diagrammatically a device for carrying out the method of the invention and, in the illustrated embodiment, especially employed for calibrating jacket tubes by means of a floating calibrating mandrel 6 instead of the column of fuel tablets 61. The jacket tube 10 is advanced stepwise with the aid of a suitable transporting device 4 through a compression device formed of a disc-shaped pressure-tight housing 21, containing a ring-shaped pressure chamber 25 in the interior thereof. The pressure chamber 25 is closed off from the jacket tube 10 by a ring-shaped sealing member 3 which serves simultaneously as a pressure cushion. The ring-shaped chamber 25 is connected to a pressure producer 5 which presses the pressure cushion 3 against the jacket tube 10 in time or cadence with the stepwise feeding of the transport device 4, and thereby presses the jacket tube at 11 onto the calibrating mandrel 6. The pressure producer 5 can be a pump, for example, with appropriate valves or, as shown in the embodiment of FIG. 3, is an electromagnetic pressure producer that is provided with an electromagnet coil 53 and an armature 52. When the coil 53 is energized, the armature 52 actuates the pressure piston 51 and, after one operating stroke, is returned to its initial position by a reset compression spring 54. Due to the uniform force of the magnet 53, a continually constant operating pressure is attained that is independent of the length of stroke of the piston 51 (and therewith independent of the deformed volume. A supply tank 55 for the pressure medium such as high pressure oil, for example, communicates with the cylinder in which the pressure piston 51 is reciprocated so that any possible pressure medium losses are automatically adjusted or compensated.

the transporting device 4 is made up of a pair of clamping jaws or grippers 43 which are slidingly mounted in a tensioning lock 42. The tensioning lock proper is maintained in the position shown in FIG. 3 by reset compression springs 41. The clamping jaws 43 are advanced in transporting direction toward the left-hand side of FIG. 3, for example, with the aid of an eccentric push rod 44, so as to feed the jacket tube 10 in that direction. The clamping jaws 43, due to the conical guide formed in the tensioning lock 42 comes into force-locking engagement with the jacket tube 10 and thereby entrains the latter. In the limit position of the electrical feed magnet armature 52 of the pressure producer 5, the magnet coil 53 is energized periodically by a cam switch mechanism 46, 47 connected with the drive 45 for the eccentric push rod 44, and the oil in the chamber 25 is accordingly compressed by the pressure piston 51. The pressure cushion 3 then presses the jacket tube 10 onto the calibrating mandrel 6 located within the tube 10. Of course, instead of a calibrating mandrel 6, a column of nuclear fuel tablets 61 proper, as shown in FIG. 2, can be substituted for the mandrel 6. By this compression step, the jacket tube 10 is held in the position shown in FIG. 3, while the eccentric rod 44 then withdraws the clamping jaws 43 toward the right-hand side of FIG. 3, so that the jaws 43 open and the tensioning lock 42 is returned by the reset spring 41 to the initial position thereof. In the interim, the jacket tube deforming operation is completed, the electrical feed magnet 53 is switched off, the reset spring 54 forces the pressure piston 51 back toward the right-hand side of FIG. 3, and thereby relieves the pressure cushion 3. Thereafter, the eccentric push rod 44 again pushes the clamping jaws 43 together with the jacket tube 10 the adjusted step distance toward the left-hand side of FIG. 3, the jacket tube deforming operation is again instituted and the aforementioned sequence of events takes place once again. The device is best adjusted so that the zones of deformation overlap somewhat whereby an absolutely uniformly smooth surface of the deformed jacket tube is obtained.

Obviously the method of the invention can be carried out with devices having a structure that varies from that shown in the embodiment of FIG. 3.

It should be noted that in carrying out the method of charging fuel tablets into a jacket tube, a considerably shorter amount of time is required than had to be expended therefor heretofore by previously employed methods. The pressing of the jacket tube onto the mandrel or fuel tablet column takes about 1 minute per meter. Therewith, all prerequisites are met for including these operating steps also in a normal manufacturing flow.

We claim:

1. Method of reducing the spacing between a jacket tube of larger cross sectional dimension of a nuclear reactor fuel rod and a body such as a charge of fuel of smaller cross sectional dimension receivable in the jacket tube or a mandrel of the same cross sectional dimension as the charge of fuel receivable in the jacket tube which comprises pressing and permanently deforming by means of a ring-shaped pressure cushion a respective ring-shaped zone of the jacket tube onto the body, and simultaneously advancing the jacket tube and the body stepwise through the pressure cushion, the length of each advancing step being adjusted to the width of the ring-shaped zone.

2. Method according to claim 1, wherein the body is a floating mandrel, and the ring-shaped jacket tube zone is pressed and permanently deformed onto the floating mandrel.

3. Method according to claim 1, wherein the body is a charge of fuel, and the ring-shaped jacket tube zone is pressed and permanently deformed onto the charge of fuel received therein.

4. Device for carrying out a method of reducing the spacing between a jacket tube of larger cross sectional dimension of a nuclear reactor fuel rod and a body such as a charge of fuel of smaller cross sectional dimension receivable therein or a mandrel of the same cross sectional dimension as the charge of fuel receivable in the jacket tube, comprising a ring-shaped hydraulic pressure cushion and means for stepwise advancing through the pressure cushion a jacket tube with the body disposed in the tube, said pressure cushion being actuable for pressing and permanently deforming a respective ring-shaped zone of the jacket tube onto said body, said ring-shaped zone having a width corresponding to the length of each advancing step of said jacket tube.

5. Device according to claim 4, wherein said pressure cushion consists of oil-tight, elastic sealing material, and is disposed in a ring-shaped metallic pressure chamber for sealing said chamber from said jacket tube.

6. Device according to claim 4, including means containing a substantially incompressible medium, said pressure cushion being connected to said means so as to be subjected to pressure exerted by said medium and means for varying said pressure in cadence with said stepwise advance for imparting a sequential compression action to the jacket tube.

7. Device according to claim 6 including a high pressure pump, and control valve means connected therewith for pressurizing said medium.

8. Device according to claim 6 including an oil-filled cylinder connected to said medium-containing means and a magnetically actuable piston, displaceable in said cylinder for periodically pressurizing said pressure medium and said pressure cushion.

9. Device according to claim 4, wherein said means for advancing the jacket tube stepwise through said ring-shaped pressure cushion is a pair of clamping jaws, and an eccentric drive connected thereto for actuating the same.

10. Method of claim 1 for reducing the spacing between a jacket tube having a wave-shaped surface and the body receivable therein which comprises adjusting the length of the advancing steps of the tube so that they are longer than the width of the ring-shaped pressure zones.

11. Method of calibrating thin-walled tubes which comprises pressing and permanently deforming by means of a ring-shaped pressure cushion a respective ring-shaped zone of a tube onto a mandrel disposed in the tube and having a predetermined cross-sectional dimension and simultaneously advancing the tube stepwise through the pressure cushion, the length of each advancing step being adjusted to the width of the ring-shaped zone.

* * * * *